United States Patent
Obryk et al.

(10) Patent No.: US 11,425,281 B1
(45) Date of Patent: Aug. 23, 2022

(54) COLOR IMAGE PROCESSING USING MODELS OF OVERLAPPED RESPONSE SPECTRA FOR RETINAL CONE CELLS

(71) Applicant: GOOGLE LLC, Mountain View, CA (US)

(72) Inventors: Robert Obryk, Zurich (CH); Jyrki Antero Alakuijala, Wollerau (CH)

(*) Notice: Subject to any disclaimer, the term of this patent is extended or adjusted under 35 U.S.C. 154(b) by 135 days.

(21) Appl. No.: 15/258,368

(22) Filed: Sep. 7, 2016

(51) Int. Cl.
| G06K 9/00 | (2022.01) |
| H04N 1/60 | (2006.01) |
| H04N 1/64 | (2006.01) |
| G06V 10/28 | (2022.01) |

(52) U.S. Cl.
CPC ........... H04N 1/6088 (2013.01); G06V 10/28 (2022.01); H04N 1/644 (2013.01)

(58) Field of Classification Search
None
See application file for complete search history.

(56) References Cited

U.S. PATENT DOCUMENTS

| | | | | |
|---|---|---|---|---|
| 5,166,783 A | * | 11/1992 | Hodgson | H04N 1/60 348/E9.037 |
| 5,617,116 A | * | 4/1997 | Edgar | H04N 1/6088 345/603 |
| 5,848,199 A | * | 12/1998 | Naqvi | G06T 3/00 358/448 |
| 5,862,434 A | * | 1/1999 | Yamakawa | G03G 13/0133 399/54 |
| 6,014,462 A | * | 1/2000 | Yamakawa | G06K 9/00456 358/464 |
| 6,292,596 B1 | * | 9/2001 | Snyder | H04N 1/00795 382/128 |
| 6,414,426 B1 | * | 7/2002 | Akashi | C09K 11/7734 313/486 |
| 6,654,142 B1 | * | 11/2003 | Min | G06K 15/02 358/1.9 |
| 6,847,737 B1 | * | 1/2005 | Kouri | G06T 5/002 382/275 |
| 7,272,265 B2 | * | 9/2007 | Kouri | G06V 10/30 382/275 |
| 7,447,353 B2 | * | 11/2008 | Diederichs | B41F 33/0036 382/165 |
| 7,609,878 B2 | * | 10/2009 | Lohweg | G01J 3/46 345/589 |

(Continued)

OTHER PUBLICATIONS

Wikipedia, "Gamma correction", Aug. 6, 2016.*

(Continued)

*Primary Examiner* — Feng Niu

(74) *Attorney, Agent, or Firm* — Young Basile Hanlon & MacFarlane, P.C.

(57) ABSTRACT

Techniques of color image processing involve performing a transformation for each color channel that mixes intensity values from other channels to produce a new intensity value for that channel. The new intensity values, representing the effect of overlapped response spectra of the S, M, and L cones, then provide values of the sensitivities of the photoreceptors of each of the cones. These values of the sensitivities form the basis of more accurate color image processing. For example, compression ratios of gamma-compressed color images may be increased when more the sensitivities are more accurate.

18 Claims, 4 Drawing Sheets

(56) References Cited

U.S. PATENT DOCUMENTS

| | | | | |
|---|---|---|---|---|
| 7,706,607 | B2* | 4/2010 | Malvar | H04N 1/64 382/166 |
| 7,986,356 | B2* | 7/2011 | Chang | H04N 9/3147 348/187 |
| 8,203,564 | B2* | 6/2012 | Jiao | G06T 15/005 345/421 |
| 8,594,418 | B2* | 11/2013 | Jonsson | G06T 5/00 382/163 |
| 8,760,714 | B1* | 6/2014 | Keithley | H04N 1/60 358/1.9 |
| 9,626,775 | B1* | 4/2017 | Safaee-Rad | G01J 3/506 |
| 9,667,842 | B2* | 5/2017 | Baqai | H04N 5/217 |
| 9,905,022 | B1* | 2/2018 | Gordon | G06T 7/90 |
| 9,916,638 | B2* | 3/2018 | Yeung | G06T 5/007 |
| 2003/0052904 | A1* | 3/2003 | Gu | G09G 3/3216 345/691 |
| 2004/0071363 | A1* | 4/2004 | Kouri | G06K 9/00516 382/128 |
| 2005/0259869 | A1* | 11/2005 | Lohweg | G01J 3/46 382/162 |
| 2005/0280857 | A1* | 12/2005 | Sugiyama | H04N 1/00236 358/1.13 |
| 2006/0110022 | A1* | 5/2006 | Zhang | G06T 5/40 382/169 |
| 2006/0251320 | A1* | 11/2006 | Diederichs | B41F 33/0036 382/165 |
| 2006/0291720 | A1* | 12/2006 | Malvar | H04N 1/64 382/166 |
| 2008/0094410 | A1* | 4/2008 | Jiao | G06T 15/503 345/592 |
| 2008/0117231 | A1* | 5/2008 | Kimpe | G09G 3/20 345/629 |
| 2008/0198168 | A1* | 8/2008 | Jiao | G06T 15/005 345/506 |
| 2008/0205796 | A1* | 8/2008 | Jonsson | G06F 3/04847 382/311 |
| 2009/0027523 | A1* | 1/2009 | Chang | H04N 9/3147 348/254 |
| 2016/0065795 | A1* | 3/2016 | Baqai | H04N 5/217 348/241 |
| 2017/0085867 | A1* | 3/2017 | Baran | H04N 13/122 |
| 2017/0140556 | A1* | 5/2017 | Safaee-Rad | H04N 1/60 |
| 2017/0161882 | A1* | 6/2017 | Mantiuk | A61B 3/024 |
| 2018/0025464 | A1* | 1/2018 | Yeung | G06T 5/007 348/234 |

OTHER PUBLICATIONS

Watson, "DCT quantization matrices visually optimized for individual images." In Human vision, visual processing, and digital display IV, vol. 1913, pp. 202-216. International Society for Optics and Photonics, 1993. (Year: 1993).*

Watson et al., "Visibility of wavelet quantization noise." IEEE Transactions on image processing 6, No. 8 (1997): 1164-1175. (Year: 1997).*

Ansari et al., "JPEG and JPEG2000." In The Essential Guide to Image Processing, pp. 421-461. Academic Press, 2009. (Year: 2009).*

\* cited by examiner

COLOR IMAGE PROCESSING USING MODELS OF OVERLAPPED RESPONSE SPECTRA FOR RETINAL CONE CELLS

TECHNICAL FIELD

This description relates to color image processing.

BACKGROUND

Conventional techniques of color image processing involve modeling the intensity-dependent sensitivity of the human eye to light as a gamma compression separately for each color channel, e.g., S (blue), M (green), and L (red) cones.

SUMMARY

In one general aspect, a method of performing color image processing can include receiving color image data representing a color image, the first color image data including a first color channel and a second color channel, the first color channel including a first linearly scaled intensity value, the second color channel including a second linearly scaled intensity value. The method can also include performing a transformation on each of the first linearly scaled intensity value and the second linearly scaled intensity value to produce, respectively, a first mixed intensity value associated with the first color channel and a second mixed intensity value associated with the second color channel, each of the first mixed intensity value and the second mixed intensity value being based on a combination of the first linearly scaled intensity value and the second linearly scaled intensity value. The method can further include applying a nonlinear function to each of the first mixed intensity value and the second mixed intensity value to produce, respectively, a first sensitivity value associated with the first color channel and a second sensitivity value associated with the second color channel, the first sensitivity value and the second sensitivity value being based on an overlap between response spectra of cone cell photoreceptors in a human retina to which the first color channel and the second color channel correspond.

The details of one or more implementations are set forth in the accompanying drawings and the description below. Other features will be apparent from the description and drawings, and from the claims.

DETAILED DESCRIPTION

As mentioned above, conventional techniques of color image processing involve modeling the intensity-dependent sensitivity of the human eye to light as a gamma compression separately for each color channel, e.g., S (blue), M (green), and L (red) cones. However, the response spectra of the cones overlap. Thus, green and red light can excite the S receptor. This overlap then reduces the sensitivity of the S cone to changes in intensity of blue light. Such reduced sensitivity can cause inaccuracies in representing a color image.

In accordance with the implementations described herein and in contrast with the above-described conventional techniques of color image processing, improved techniques involve performing a transformation for each color channel that mixes intensity values from other channels to produce a new intensity value for that channel. The new intensity values, representing the effect of overlapped response spectra of the S, M, and L cones, then provide values of the sensitivities of the photoreceptors of each of the cones. These values of the sensitivities form the basis of more accurate color image processing. For example, compression ratios of gamma-compressed color images may be increased when more the sensitivities are more accurate.

Figure 1:
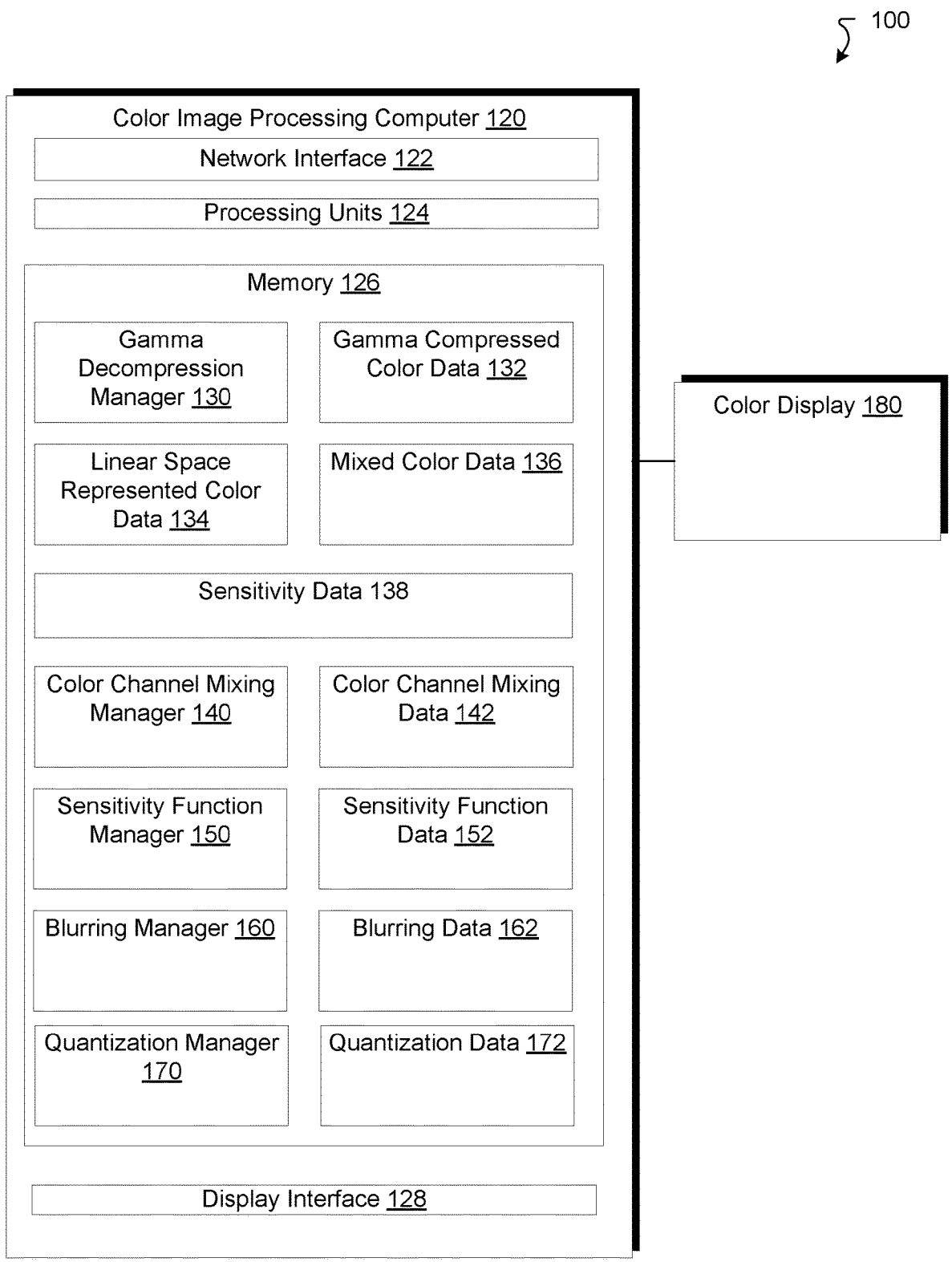
FIG. 1 is a diagram that illustrates an example electronic environment for implementing improved techniques described herein.

FIG. 1 is a diagram that illustrates an example electronic environment 100 in which the above-described improved techniques may be implemented. As shown, in FIG. 1, the example electronic environment 100 includes a color image processing computer 120.

The color image processing computer 120 is configured to provide accurate color data modeled on photoreceptor sensitivities derived from response spectra overlap in human cone cells. The color image processing computer 120 includes a network interface 122, one or more processing units 124, memory 126, and a display interface. The network interface 122 includes, for example, Ethernet adaptors, Token Ring adaptors, and the like, for converting electronic and/or optical signals received from the network 170 to electronic form for use by the point cloud compression computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein. The display interface 128 includes, for example, VGA, DVI, and/or HDMI interfaces configured to transmit display data to a color display 180.

In some embodiments, one or more of the components of the color image processing computer 120 can be, or can include processors (e.g., processing units 124) configured to process instructions stored in the memory 126. Examples of such instructions as depicted in FIG. 1 include a gamma decompression manager 130, a color channel mixing manager 140, a sensitivity function manager 150, a blurring manager 160, and a quantization manager 170. Further, as illustrated in FIG. 1, the memory 126 is configured to store various data, which is described with respect to the respective managers that use such data.

The gamma decompression manager 130 is configured to convert gamma compressed color data 132 into linear space represented color data 134. The gamma compressed color data 132 has intensity values approximately distributed according to how humans perceive brightness at the retina, while the linear space represented color data 134 has intensity values uniformly distributed. The conversion is typically represented by a nonlinear function of the intensity data.

Each of the gamma compressed color data 132 and the linear space represented color data 134 includes groups of pixel arrays, each group representing a color channel. For example, when the color scheme is RGB, each of the gamma compressed color data 132 and the linear space represented color data 134 may include three groups of pixels: one representing a red channel, one representing a green channel, and one representing a blue channel.

In the gamma compressed color data 132, the intensity values are scaled in a nonlinear fashion so that there are more quantized values ("buckets") that correspond to dark light and fewer buckets that correspond to bright light. Such a scaling more closely represents actual human visual sensitivity and provides better color data compression. The values of the pixel data in each component represents a brightness, or intensity, of that component of light at a pixel. In some implementations, the intensity of a pixel for a color channel is, for example, quantized and takes a value between 0 (dark) to 255 (or 127, 63, 31, 15, or 511, 1023, and so on) (bright). In some implementations, the values and/or quantization can be different.

The nonlinear function used to convert the intensity values I of the gamma compressed color data 132 to the intensity values of the linear space represented color data 134 may be, in some implementations, a piecewise continuous function. For example, the nonlinear function may take the form $$P \cdot I, 0 < I < I_0$$

$$(Q + R \cdot I)^{1/\gamma}, I > I_0,$$

where the constants P, Q, R, and $I_0$ are positive and $\gamma \in [2,3]$. In a typical implementation, $\gamma = 2.2$, approximately. In other implementations, the nonlinear function may be continuous rather than piecewise continuous.

The color channel mixing manager 140 is configured to produce intensity values of mixed color data 136 for each color channel based on intensity values for all of the color channels of the linear space represented color data 134. Along these lines, the intensity values for each of the color channels in the gamma compressed color data 132 and, accordingly, the linear space represented color data 134, are derived under the assumption that the response spectra of a human's cone cell photoreceptors do not overlap. For example, S cones might have been modeled as having a response to wavelengths between 600 nm-700 nm, M cones might have been modeled as having a response to wavelengths between 500 nm-600 nm, and L cones might have been modeled as having a response to wavelengths between 400 nm-500 nm. However, in reality the response spectra of each of the cones overlap, with each of the response spectra having nonzero values between the entire visual spectrum of approximately 400 nm-700 nm.

The effect of the overlapping of the response spectra is to reduce the sensitivities of each color channel's photoreceptor with respect to sensitivities of photoreceptors of color channels having non-overlapping response spectra. As an example, consider pure green light incident upon a human retina. Ideally, only the green (M) cone cell photoreceptors would respond with some electrical signal. However, because of the overlap, the red (S) and blue (L) cone photoreceptors also have some electrical response, albeit smaller. The detection of the electrical responses in the retina is accomplished via a nonlinear transform of the responses to produce sensitivities. The effect of the transform is to suppress all of the sensitivities of the photoreceptors to the point where only the green response is detectable in the retina.

Mathematically, the mixing of the intensity values of the color channels A, B, C, . . . of the linear space represented color data 134 to produce the intensity values of the color channels A', B', C', . . . of the mixed color data 136 may be expressed generally as follows:

$$A' = f_A(A, B, C, \ldots)$$

$$B' = f_B(A, B, C, \ldots)$$

$$C' = f_C(A, B, C, \ldots),$$

and so on. Information describing the functions $f_A$, $f_B$, $f_C$, . . . are included in the color channel mixing data 142 stored in the memory 126. In the simplest case, the functions $f_A$, $f_B$, $f_C$, . . . , are linear functions of the intensity values of the linear space represented color data 134. In such a case, the above mathematical relations may be expressed as a matrix equation. For example, when the color channels correspond to RGB components, then the above mixing of the intensity values of each color channel may be expressed as follows:

$$\begin{pmatrix} R' \\ G' \\ B' \end{pmatrix} = M \begin{pmatrix} R \\ G \\ B \end{pmatrix},$$

where M is a 3×3 matrix. It has been found that a useful value of M is approximately $$\begin{pmatrix} 0.942 & 0.502 & 0.220 \\ 0.553 & 0.905 & 0.0185 \\ 0.0 & 0.539 & 0.579 \end{pmatrix}.$$

The values of the matrix elements would be included in the color channel mixing data 142.

The sensitivity function manager 150 is configured to output sensitivity data 138 from the mixed color data 136. As discussed above, the sensitivity function takes the form of a nonlinear function of the intensity values at each pixel for each color channel. In some arrangements, the nonlinear function takes the form of an inverse of the piecewise continuous function above:

$$P' \cdot I, 0 < I < I_0$$

$$(Q' + R' \cdot I)^{\gamma}, I > I_0,$$

where the constants P, Q, R, and $I_0$ are positive and $\gamma \in [2,3]$. However, such an implementation is by no means necessary. For example, in other implementations, the nonlinear function may take the form of a polynomial function of the intensity values of the mixed color data 136. In this case, it has been found that a $10^{th}$ degree polynomial may be used to produce accurate sensitivity data 138. Coefficients of such a polynomial and/or the constants of the piecewise continuous function may be included in sensitivity function data 152.

The blurring manager 160 is configured to provide a blurring of a color image. Typically, such a blurring may be achieved by performing a convolution operation on the color image and a smooth, blurring function represented in discrete form using a matrix. A commonly-used blurring function is a normalized Gaussian function of some width σ. For such a function, the blurring data 162 may simply consist of the value of the width σ. However, in general the blurring data 162 may include matrix elements representing discrete samples of the blurring function.

One instance in which the blurring manager 160 may be invoked is when it is desired to account for jitter in eye movement. The resulting blurring function would then model the photoreceptor dynamics. Because of jitter, a bright pixel interacts with a neighboring dark pixel such that the bright pixel experiences photochemical effects of the dark pixel. Accordingly, the photoreceptor detects the dark pixel less well. This can be modeled, for example, by a Gaussian function with a width σ between about 0.5 pixels to about 2.0 pixels.

The quantization manager 170 is configured to generate quantization data 172 that is used to quantize color images such as the linear space represented color data 134. The quantization data 172 may then take the form of an array of values at each pixel. In one example, the quantization manager 170 generates the quantization data 172 by computing a derivative of the nonlinear function used by the sensitivity function manager 150. In other arrangements, the quantization manager 170 generates the quantization data 172 by computing a ratio of the sensitivity data 138 and the mixed color data 136.

Some implementations may consider mixing spontaneous activations of rhodopsin. Such implementations model a mixing of a constant thermal channel to every other channel with a constant factor. Such a mixing biases the nonlinear behavior and changes the derivative slightly.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the user device 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the user device 120.

The components (e.g., modules, processing units 124) of the color image processing computer 120 can be configured to operate based on one or more platforms (e.g., one or more similar or different platforms) that can include one or more types of hardware, software, firmware, operating systems, runtime libraries, and/or so forth. In some implementations, the components of the color image processing computer 120 can be configured to operate within a cluster of devices (e.g., a server farm). In such an implementation, the functionality and processing of the components of the color image processing computer 120 can be distributed to several devices of the cluster of devices.

The components of the color image processing computer 120 can be, or can include, any type of hardware and/or software configured to process attributes. In some implementations, one or more portions of the components shown in the components of the color image processing computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the color image processing computer 120 can be, or can include, a software module configured for execution by at least one processor (not shown). In some implementations, the functionality of the components can be included in different modules and/or different components than those shown in FIG. 1.

Although not shown, in some implementations, the components of the color image processing computer 120 (or portions thereof) can be configured to operate within, for example, a data center (e.g., a cloud computing environment), a computer system, one or more server/host devices, and/or so forth. In some implementations, the components of the color image processing computer 120 (or portions thereof) can be configured to operate within a network. Thus, the components of the color image processing computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the color image processing computer 120 can be, or can include, processors configured to process instructions stored in a memory. For example, the gamma decompression manager 130 (and/or a portion thereof), the color channel mixing manager 140 (and/or a portion thereof), the sensitivity function manager 150 (and/or a portion thereof), the blurring manager 160 (and/or a portion thereof), and the quantization manager 170 (and/or a portion thereof) can be a combination of a processor and a memory configured to execute instructions related to a process to implement one or more functions.

Figure 2:
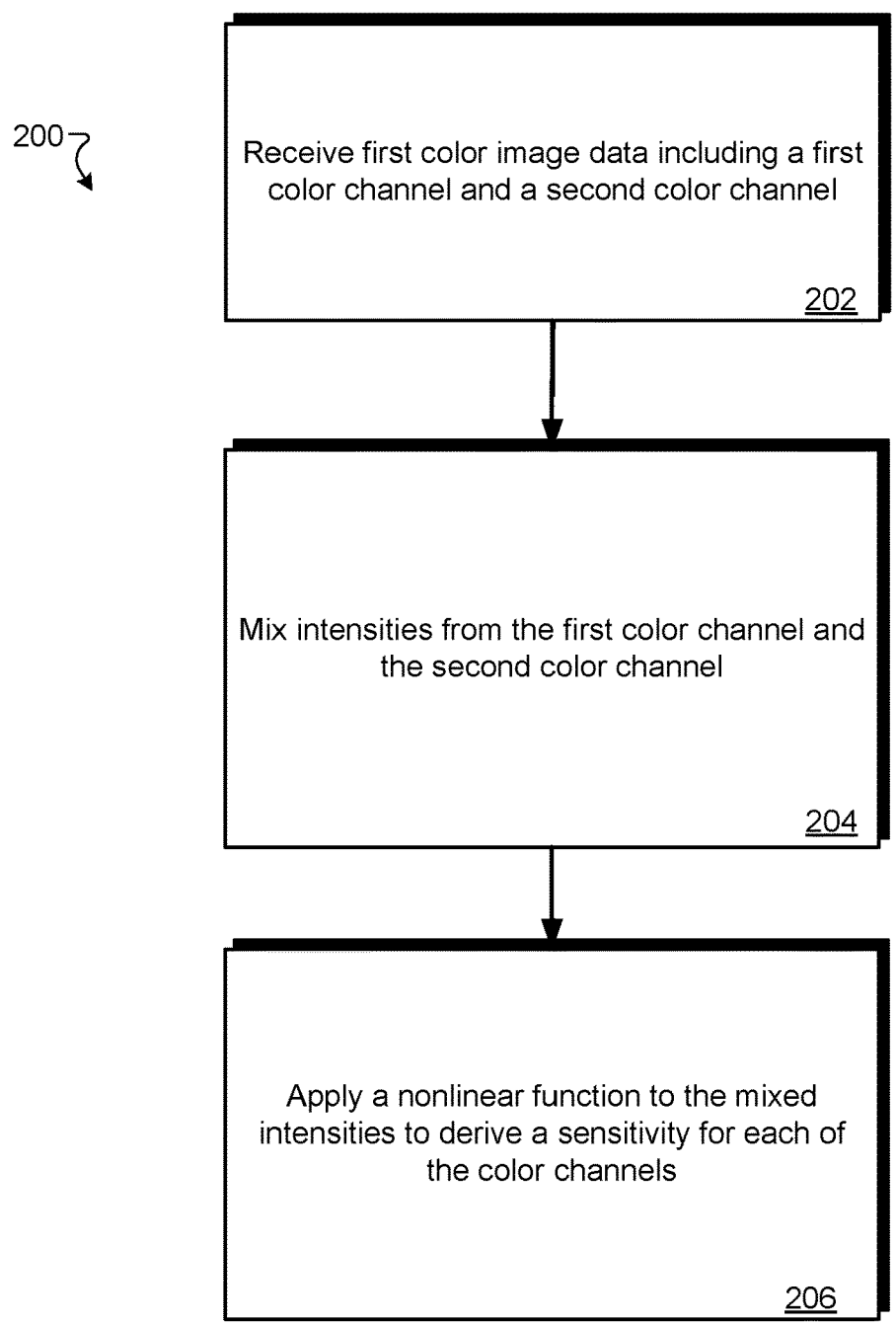
FIG. 2 is a flow chart that illustrates an example method of performing the improved techniques within the electronic environment shown in FIG. 1.

FIG. 2 is a flow chart that illustrates an example method 200 of performing color image processing. The method 200 may be performed by software constructs described in connection with FIG. 1, which reside in memory 126 of the point cloud compression computer 120 and are run by the set of processing units 124.

At 202, color image data representing a color image is received. The color image data includes a first color channel and a second color channel. The first color channel includes a first linearly scaled intensity value and the second color channel includes a second linearly scaled intensity value.

At 204, a transformation is performed on each of the first linearly scaled intensity value and the second linearly scaled intensity value to produce, respectively, a first mixed intensity value associated with the first color channel and a second mixed intensity value associated with the second color channel. Each of the first mixed intensity value and the second mixed intensity value are based on a combination of the first linearly scaled intensity value and the second linearly scaled intensity value.

At 206, a nonlinear function is applied to each of the first mixed intensity value and the second mixed intensity value to produce, respectively, a first sensitivity value associated with the first color channel and a second sensitivity value associated with the second color channel. The first sensitivity value and the second sensitivity value are based on an overlap between response spectra of cone cell photoreceptors in a human retina to which the first color channel and the second color channel correspond.

Figure 3:
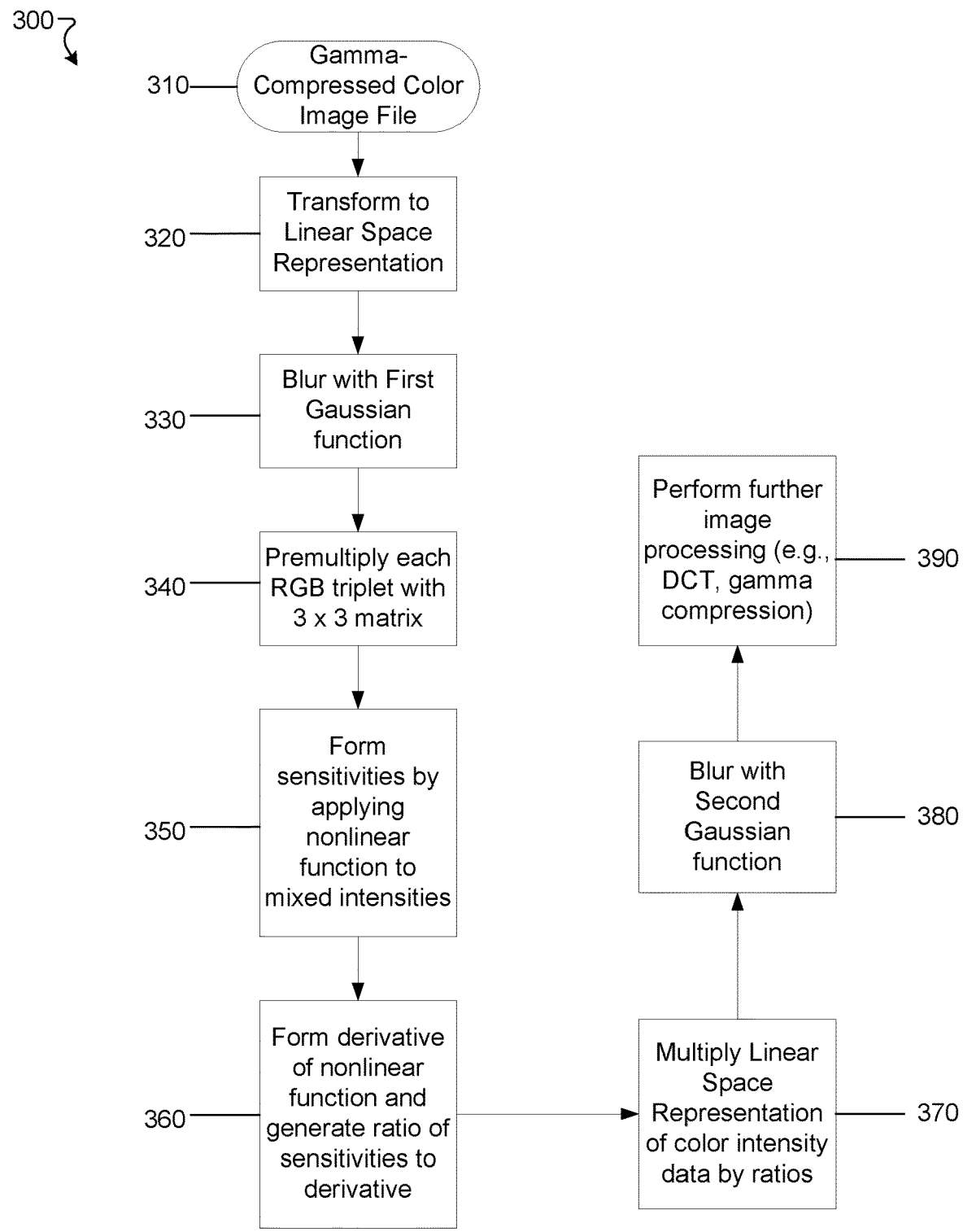
FIG. 3 is a flow chart that illustrates another example method of performing the improved techniques within the electronic environment shown in FIG. 1.

FIG. 3 illustrates another example process 300 of performing color image processing. The method 300 may be performed by software constructs described in connection with FIG. 1, which reside in memory 126 of the point cloud compression computer 120 and are run by the set of processing units 124. It will be assumed for this example that the color channels correspond to components of an RGB color scheme.

At 310, the color image processing computer 120 has a gamma-compressed color image file that contains gamma-compressed color data such as the gamma-compressed color data 132 (FIG. 1).

At 320, the color image processing computer 120, using the gamma decompression manager 130, performs a nonlinear transformation of the gamma-compressed color data to produce a linear space representation of the color data, such as the linear space represented color data 136. As discussed above, the nonlinear transformation may take the form of a piecewise continuous function that is linear for small intensity values and roughly a square root of the value of the intensity (or number of photons) for larger values of the intensity.

At 330, the color image processing computer 120 convolves the linear space representation of the color data (separately for each RGB color channel) with a discretized Gaussian blur function (e.g., with width $\sigma=0.9$ to represent jitter of the human eye and movements of the head. This convolution produces a blurred linear space representation of the color data.

At 340, the color image processing computer 120 premultiplies each RGB intensity triplet with a 3×3 matrix, i.e., the matrix M described above. This premultiplication models the overlap in the response spectra of each cone photoreceptor and results in mixed color data, i.e., the mixed color data 136.

At 350, the color image processing computer 120 produces sensitivity data, e.g., sensitivity data 138, from the mixed color data. For example, the sensitivity function manager 150 uses the sensitivity function data 152 to form a nonlinear function of the intensity values of the mixed color data. In one implementation, the nonlinear function is the second piecewise continuous function described above. In another implementation, the nonlinear function is a tenth-degree polynomial in the intensity values.

At 360, the color image processing computer 120 forms a matrix of values of a derivative of the nonlinear function of the intensity values. The color image processing computer 120 then performs a term-by-term division of the sensitivity data by the derivative data to form a quantization matrix for quantizing the linear representation of the color data.

At 370, the color image processing computer 120 performs a term-by-term multiplication of the quantization matrix and the intensity values of the linear representation of the color data to produce rescaled color data. These intensity values of the rescaled color data may then be quantized, i.e., placed into a number (e.g., 256) of bins representing ranges of intensity values. Such rescaling and quantization may improve, if not optimize, the appearance of color images on the color display 180 (FIG. 1).

At 380, prior to quantization, the color image processing computer 120 performs a convolution of the intensity values of the rescaled color data with another Gaussian blur function. In this case, the blur function has a smaller width, e.g., $\sigma=0.5$.

At 390, the color image processing computer 120 performs some other image processing function. For example, post-quantization, the color image processing computer 120 may compress the rescaled color image. This quantized, rescaled color image may have a higher compression ratio than the original gamma-compressed color image file. Other image processing functions may also include performing a spatial frequency analysis of the color image through, e.g., a discrete cosine transform.

Figure 4:
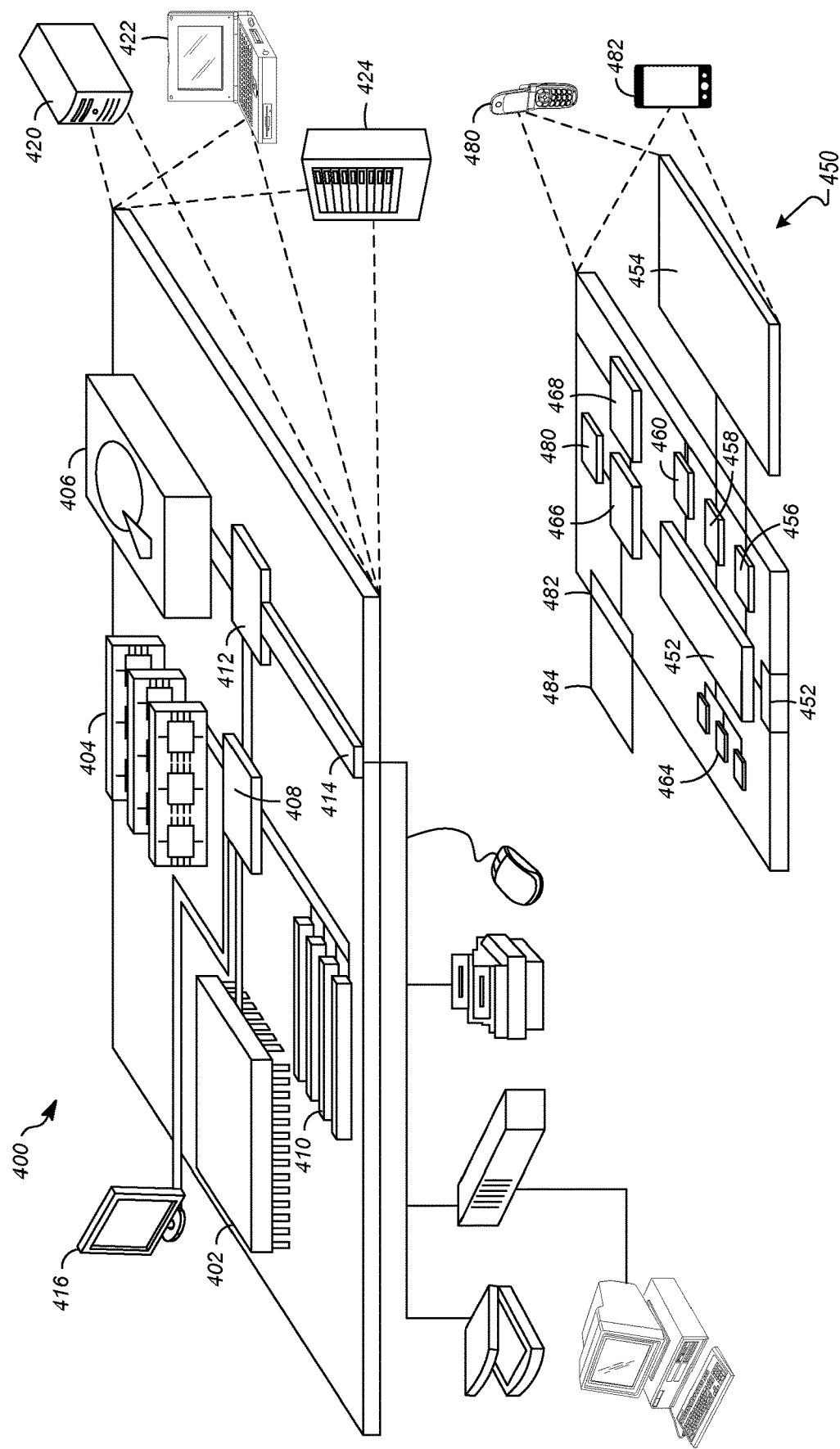
FIG. 4 illustrates an example of a computer device and a mobile computer device that can be used with circuits described here.

FIG. 4 illustrates an example of a generic computer device 400 and a generic mobile computer device 450, which may be used with the techniques described here.

As shown in FIG. 4, computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method of performing color image processing, the method comprising:
receiving, by processing circuitry of the computer, color image data representing a color image, the color image data including a first color channel and a second color channel, the first color channel including a first linearly scaled intensity value, the second color channel including a second linearly scaled intensity value;
performing a transformation on each of the first linearly scaled intensity value and the second linearly scaled intensity value to produce, respectively, a first mixed intensity value associated with the first color channel and a second mixed intensity value associated with the second color channel, each of the first mixed intensity value and the second mixed intensity value being based on a combination of the first linearly scaled intensity value and the second linearly scaled intensity value;
applying a nonlinear function to the first mixed intensity value to produce a first sensitivity value associated with the first color channel;
applying the nonlinear function to the second mixed intensity value to produce a second sensitivity value associated with the second color channel;
generating a compressed color image based on the first sensitivity value and the second sensitivity value, wherein generating the compressed color image includes:
performing a quantization operation using the nonlinear function on each of the first sensitivity value and the second sensitivity value to produce a first quantized intensity value and a second quantized intensity value, wherein the quantization operation includes forming a quantization matrix using a derivative of the nonlinear function; and
outputting the compressed color image for subsequent presentation.

2. The computer-implemented method as in claim 1, wherein the transformation is a linear transformation, and wherein performing the first transformation on each of the first linearly scaled intensity value and the second linearly scaled intensity value includes defining a matrix of floating-point values, each of the floating-point values of the matrix indicating a degree of overlap between response spectra of the cone cell photoreceptors in the human retina to which the first color channel and the second color channel correspond.

3. The computer-implemented method of claim 1, wherein the first color channel is a red color channel that includes intensity values indicating a proportion of red light and wherein the second color channel is a green color channel that includes intensity values indicating a proportion of green light, and
wherein the method further comprises receiving a blue color channel that includes intensity values indicating a proportion of blue light.

4. The computer-implemented method of claim 1, wherein receiving the color image data includes applying another nonlinear function to gamma compressed intensity values of a gamma compressed color image to produce, as the color image data, color image data in a linear space representation.

5. The computer-implemented method of claim 4, further comprising, prior to performing the transformation on each of the first linearly scaled intensity value and the second linearly scaled intensity value, performing a first blur operation on intensity values produced by the application of the nonlinear function to produce the first linearly scaled intensity value and the second linearly scaled intensity value.

6. A computer-implemented method of performing color image processing, the method comprising:
receiving, by processing circuitry of the computer, color image data representing a color image derived from a gamma compressed color image having a compression ratio, the color image data including a first color channel and a second color channel, the first color channel including a first linearly scaled intensity value, the second color channel including a second linearly scaled intensity value;
performing a transformation on each of the first linearly scaled intensity value and the second linearly scaled intensity value to produce, respectively, a first mixed intensity value associated with the first color channel and a second mixed intensity value associated with the second color channel, each of the first mixed intensity value and the second mixed intensity value being based on a combination of the first linearly scaled intensity value and the second linearly scaled intensity value;
applying a nonlinear function to each of the first mixed intensity value and the second mixed intensity value to produce, respectively, a first sensitivity value associated with the first color channel and a second sensitivity value associated with the second color channel, the nonlinear function being a piecewise continuous function of intensity having at least one point of discontinuity, the first sensitivity value and the second sensitivity value being based on an overlap between response spectra of cone cell photoreceptors in a human retina to which the first color channel and the second color channel correspond;
after applying the nonlinear function to each of the first mixed intensity value and the second mixed intensity value, performing a quantization operation on each of the first sensitivity value and the second sensitivity value to produce a first quantized intensity value and a second quantized intensity value; and
generating a compressed color image with a compression ratio based on the first sensitivity value and the second sensitivity value, the compression ratio of the compressed color image being increased relative to the compression ratio of the gamma compressed color image,
wherein performing the quantization operation includes:
generating ratios of the first sensitivity value and the second sensitivity value to, respectively, the first mixed intensity value and the second mixed intensity value to produce a first multiplicative correction factor and a second multiplicative correction factor;
multiplying the first linearly scaled intensity value by the first multiplicative correction factor to produce the first quantized intensity value and multiplying the second linearly scaled intensity value by the second multiplicative correction factor to produce the second quantized intensity value.

7. The computer-implemented method of claim 1, further comprising, after applying the nonlinear function to each of the first mixed intensity value and the second mixed intensity value, performing a second blur operation on each of the first quantized intensity value and a second quantized intensity value.

8. The computer-implemented method of claim 1, wherein applying the nonlinear function to each of the first mixed intensity value and the second mixed intensity value includes raising the first mixed intensity value to the power of a first gamma value and raising the second mixed intensity value to the power of a second gamma value.

9. The computer-implemented method of claim 8, wherein the first gamma value is equal to the second gamma value.

10. A computer program product comprising a nontransitive storage medium, the computer program product including code that, when executed by processing circuitry, causes the processing circuitry to perform a method, the method comprising:
receiving color image data representing a color image, the color image data including a first color channel and a second color channel, the first color channel including a first linearly scaled intensity value, the second color channel including a second linearly scaled intensity value;
performing a transformation on each of the first linearly scaled intensity value and the second linearly scaled intensity value to produce, respectively, a first mixed intensity value associated with the first color channel and a second mixed intensity value associated with the second color channel, each of the first mixed intensity value and the second mixed intensity value being based on a combination of the first linearly scaled intensity value and the second linearly scaled intensity value; and
applying a nonlinear function to each of the first mixed intensity value and the second mixed intensity value to produce, respectively, a first sensitivity value associated with the first color channel and a second sensitivity value associated with the second color channel, the nonlinear function being a piecewise continuous function of intensity having at least one point of discontinuity, at least one piece of the piecewise continuous function being nonlinear; and
generating a compressed color image based on the first sensitivity value and the second sensitivity value, wherein generating the compressed color image includes quantization based on the nonlinear function, wherein quantization based on the nonlinear function includes performing a quantization operation based on the nonlinear function on each of the first sensitivity value and the second sensitivity value to produce a first quantized intensity value and a second quantized intensity value, wherein performing the quantization operation includes:

generating ratios of the first sensitivity value and the second sensitivity value to, respectively, the first mixed intensity value and the second mixed intensity value to produce a first multiplicative correction factor and a second multiplicative correction factor; and multiplying the first linearly scaled intensity value by the first multiplicative correction factor to produce the first quantized intensity value and multiplying the second linearly scaled intensity value by the second multiplicative correction factor to produce the second quantized intensity value.

11. The computer program product as in claim 10, wherein the transformation is a linear transformation, and wherein performing the first transformation on each of the first linearly scaled intensity value and the second linearly scaled intensity value includes defining a matrix of floating-point values, each of the floating-point values of the matrix indicating a degree of overlap between response spectra of the cone cell photoreceptors in the human retina to which the first color channel and the second color channel correspond.

12. The computer program product as in claim 10, wherein the first color channel is a red color channel that includes intensity values indicating a proportion of red light and wherein the second color channel is a green color channel that includes intensity values indicating a proportion of green light, and wherein the method further comprises receiving a blue color channel that includes intensity values indicating a proportion of blue light.

13. The computer program product as in claim 10, wherein receiving the color image data includes applying another nonlinear function to gamma compressed intensity values of a gamma compressed color image to produce, as the color image data, color image data in a linear space representation.

14. The computer program product as in claim 10, wherein the method further comprises, prior to performing the transformation on each of the first linearly scaled intensity value and the second linearly scaled intensity value, performing a first blur operation on intensity values produced by the application of the nonlinear function to produce the first linearly scaled intensity value and the second linearly scaled intensity value.

15. The computer program product as in claim 10, wherein method further comprises, after applying the nonlinear function to each of the first mixed intensity value and the second mixed intensity value, performing a second blur operation on each of the first quantized intensity value and a second quantized intensity value.

16. The computer program product as in claim 10, wherein applying the nonlinear function to each of the first mixed intensity value and the second mixed intensity value includes raising the first mixed intensity value to the power of a first gamma value and raising the second mixed intensity value to the power of a second gamma value.

17. The computer program product as in claim 16, wherein the first gamma value is equal to the second gamma value.

18. An electronic apparatus, comprising:

a memory, and controlling circuitry coupled to the memory, the controlling circuitry configured to:

receive color image data representing a color image, the color image data including a first color channel and a second color channel, the first color channel including a first linearly scaled intensity value, the second color channel including a second linearly scaled intensity value;

perform a transformation on each of the first linearly scaled intensity value and the second linearly scaled intensity value to produce, respectively, a first mixed intensity value associated with the first color channel and a second mixed intensity value associated with the second color channel, each of the first mixed intensity value and the second mixed intensity value being based on a combination of the first linearly scaled intensity value and the second linearly scaled intensity value; and apply a nonlinear function to at least one of the first mixed intensity value and the second mixed intensity value to produce, respectively, a first sensitivity value associated with the first color channel and a second sensitivity value associated with the second color channel, the nonlinear function being a piecewise continuous function of intensity having at least one point of discontinuity, at least one piece of the piecewise continuous function being nonlinear; and generate a compressed color image based on the first sensitivity value and the second sensitivity value, wherein to generate the compressed color image the controlling circuitry performs quantization based on the nonlinear function, wherein to perform quantization based on the nonlinear function the controlling circuitry is configured to perform a quantization operation based on the nonlinear function on each of the first sensitivity value and the second sensitivity value to produce a first quantized intensity value and a second quantized intensity value, wherein to perform the quantization operation the controlling circuitry is configured to:

generate ratios of the first sensitivity value and the second sensitivity value to, respectively, the first mixed intensity value and the second mixed intensity value to produce a first multiplicative correction factor and a second multiplicative correction factor; and multiply the first linearly scaled intensity value by the first multiplicative correction factor to produce the first quantized intensity value and multiplying the second linearly scaled intensity value by the second multiplicative correction factor to produce the second quantized intensity value.

* * * * *